JOHN H. STEINER.

3 Sheets--Sheet 1.

Improvement in Gas Apparatus.

No. 4,895.

Reissued May 7, 1872.

John H. Steiner

T. M. Coombs
Edmund M. Blunkman

JOHN H. STEINER.

3 Sheets--Sheet 2.

Improvement in Gas Apparatus.

No. 4,895.

Reissued May 7, 1872.

John H. Steiner

Witnesses
M. Blankman

3 Sheets--Sheet 3.

JOHN H. STEINER.

Improvement in Gas Apparatus.

No. 4,895. Reissued May 7, 1872.

John H. Steiner

T. M. Coombs
Edmund McBlackman

UNITED STATES PATENT OFFICE.

JOHN H. STEINER, OF CINCINNATI, OHIO.

IMPROVEMENT IN GAS APPARATUS.

Specification forming part of Letters Patent No. 125,496, dated April 9, 1872; reissue No. 4,895, dated May 7, 1872.

*To all whom it may concern:*

Be it known that I, JOHN H. STEINER, of Cincinnati, in the county of Hamilton and State of Ohio, have invented a new and useful Improvement in Gas-Works; and I do hereby declare that the following is a full, clear, and exact description thereof.

The nature of my invention relates to that class of gas-machines in which pure hydrogen gas is generated by the action of dilute acid upon metal scraps or turnings, and afterward carbureted by passing it over or through the volatile hydrocarbons, such as gasoline, &c., in order to give it the proper illuminating qualities; and it consists in a reservoir, for holding the dilute acid, placed above one or more gas-generating chambers or retorts, said reservoir and retorts being so connected and arranged, by means of suitable pipes and valves, that the dilute acid will be automatically supplied to one or more of said generators at will, and prevented from returning through the same channel, for the purposes more fully hereinafter set forth; and further, in so constructing and arranging the said retorts and reservoir in relation to each other that the weakened or spent acid solution in the retorts after use may be returned to the reservoir or discharged from the machine entirely, by the pressure of the gas within, at the will of the operator. By causing the dilute acid to enter at one end of the generator, and return to the reservoir at the other, the said acid-water is made to traverse the entire length of the generating-chamber, and will, of course, be compelled to pass over an extended surface of the metal scrap before escaping. It will be seen that, by this means, fresh uncontaminated acid will always be admitted at the front end of the generating-chambers, and that the contaminated acid will not merely play back and forth from the generator to the reservoir, excluding the fresh acid-water from the generator, as has always been the case where it is made to enter the generator and return by the same channel. It will also be perceived that, by causing the dilute acid to traverse the whole length of the generator before it can be discharged, it is impossible to discharge anything but the most useless portions, when it finally becomes necessary to remove the solution from the generators.

Figure 1:
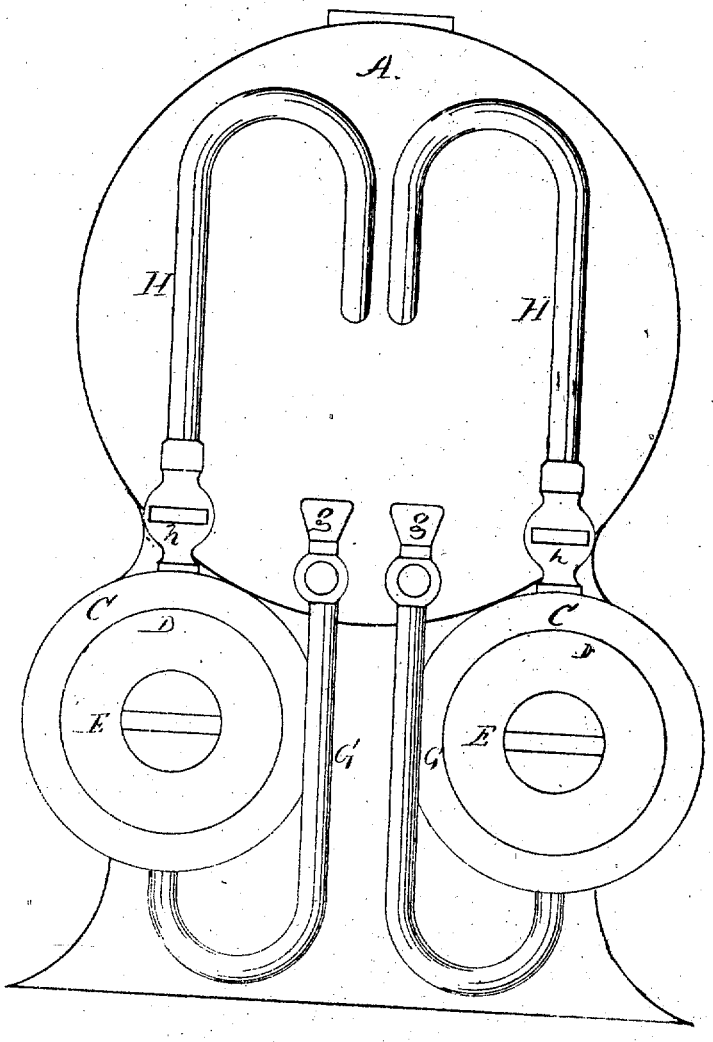
Figure 2:
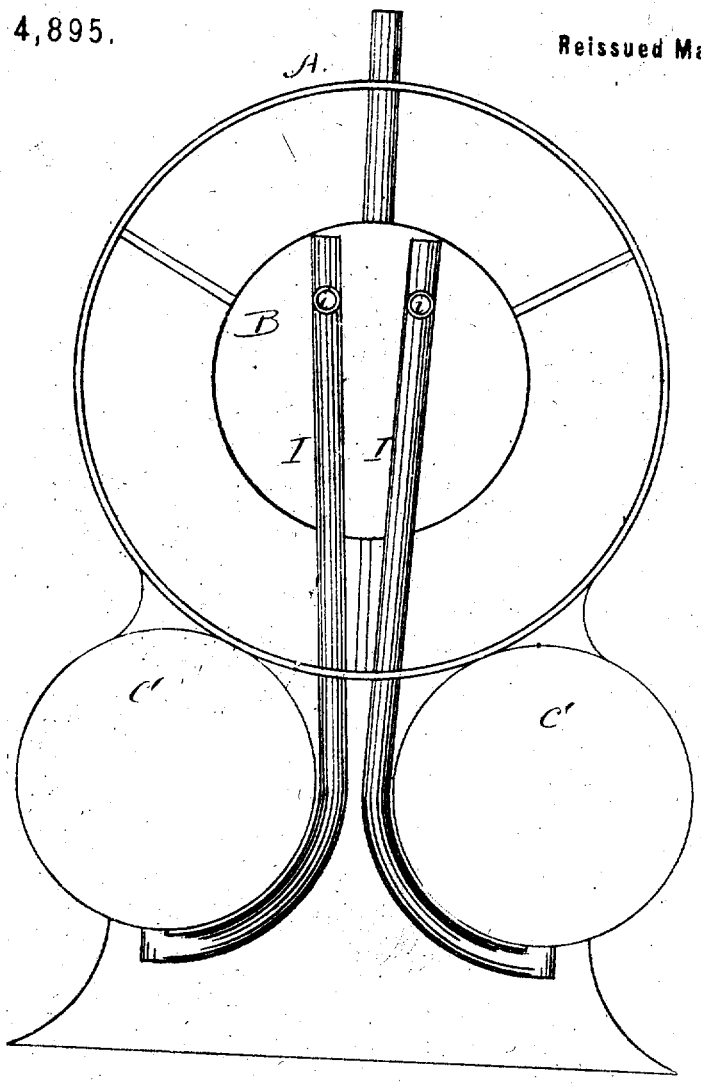
Figure 3:
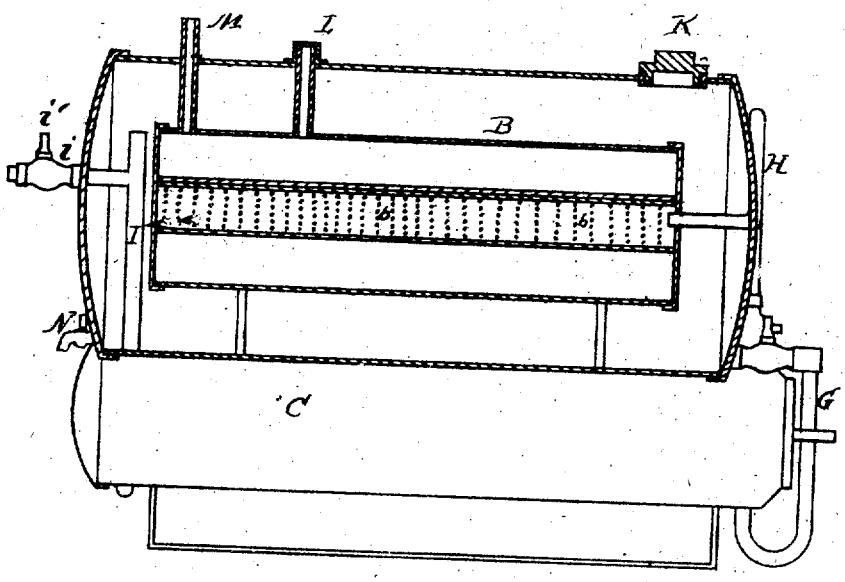
Figure 4:
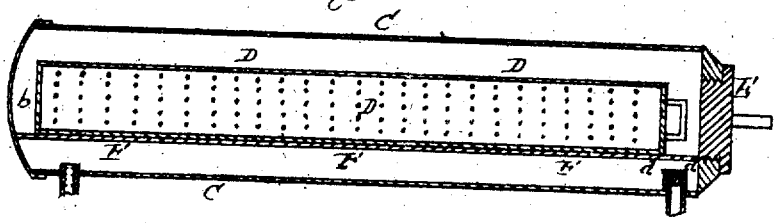

In the drawing, Figure 1 represents a front view of my apparatus; Fig. 2, a back view, with the end of the reservoir removed; Fig. 3, a sectional view of the reservoir; and Fig. 4, a sectional view of one of the retorts or tubes for holding the metal scrap.

A represents the reservoir for the dilute acid, within which is a carbureting-chamber, B, located at or near the center of said reservoir, and extending nearly from end to end of the same. Within said carbureter is secured a perforated tube, *b*, extending from end to end of the same; and above it is secured a flat plate or shelf, *b'*. The chamber B is to contain the highly-volatile distillates of petroleum, such as gasoline, &c. The gas generated in the retorts below enters at one end of the tube *b* and passes out through the perforations into and through the hydrocarbon oil, becoming highly carbureted. The space around the tube *b* may be filled with curled hair, if desired, to divide the body of gas into fine particles and more thoroughly carburet it. By placing the carbureter inside the reservoir it is protected from accident or injury from external influences, and from all contact with fire; and the temperature of its contents is kept the same as the temperature of the dilute acid. C C represent the hydrogen-gas-generating retorts, which consist of cylinders placed below the reservoir A and supporting it. Within each cylinder is secured a removable perforated cylinder, D, with a cap, *d*, on its inner end. These cylinders are to contain metal scraps, such as iron or zinc, and are supported on aprons or rests F F, or their equivalents, arranged within the retorts C C. E E are caps that fit and close the ends of the retorts C C, and which may be removed at pleasure, for the purpose of removing the tubes D D, in order to charge them. From the bottom of the reservoir extend the pipes G G into the bottom of the retorts C C, through which the acid-water is admitted from the reservoir to the retorts. Said pipes are provided, at their end in the retorts C C, with valves *d d*, to prevent any back flow of the acid into the reservoir, through said pipes, from the pressure within said retorts. H H represent pipes proceeding from the top of the retorts C C, through the front end of the reservoir A, into the center of the carbureter B, where

BEST AVAILABLE COPY they terminate within the perforated tube *b*. These pipes serve to convey the gas generated in said retorts to the carbureter, and are provided with cocks *h h*, by which the flow can be regulated or cut off entirely. I I are pipes extending from the bottom of the retorts, at their rear, up through the back portion of the reservoir, into the same, where they terminate above the highest level to which the dilute acid can rise. From these pipes the branch-pipes *i i* extend through the back of the said reservoir, said pipes being provided with stop-cocks *i' i'*. These pipes serve to return the weakened or spent acid-water to the reservoir, or to discharge it from the machine entirely through the branch-pipes, as may be desired. This is accomplished by the pressure of the gas within the retorts C C automatically. K is the inlet for filling the reservoir A, provided with a suitable cap. L is a pipe for filling the carbureter B, which is also provided with a cap; and M is the service-pipe, for conveying the gas to the burners. N is a stop-cock at the lower part of the rear of the reservoir A, for emptying it of its contents.

The operation of my apparatus is as follows: The reservoir is properly filled with dilute acid, and the carbureter B with gasoline. The cylinders D D are charged with scrap-iron or zinc, and placed in the retorts, which are then securely closed closed by the caps. The acid-water flows through the pipes G G into the retorts, lifting the valves at their ends. On coming in contact with the metal scrap in the tubes D D, hydrogen gas is immediately generated, which passes through the pipes H H into the carbureter B, entering at one end of the tube *b*, and escaping through its perforations into the gasoline, after which it passes through the pipe M to the burners. It will readily be seen that, as the dilute acid rises in the retorts, the generation of the gas will be increased, thus increasing the pressure in the machine, and stopping the flow of the dilute acid into the retorts until the pressure is removed by the gas escaping at the burner, thus automatically regulating the quantity of acid-water admitted to the retorts.

The advantages of my machine over all others of its class will be apparent. As above stated, by the arrangement of the carbureter within the reservoir, where it is submerged in acid-water, it is prevented from all injury from fire or external influences, and the machine will also be rendered more compact. The peculiar arrangement of the reservoir above the retorts also gives the machine compactness and strength, and places the whole apparatus at the convenient control of the operator. The machine, as will be perceived, is entirely automatic in its action after being set in operation, supplying the acid-water to the retort in proper quantities, and no more, during the time it is in use, and returning the partially-spent acid to the reservoir, if desired, or discharging it entirely from the machine, when it is thrown out of operation, if too much contaminated for future use, thus effectually stopping the generation of gas and consequent waste of material; besides, the apparatus can be charged while in operation without stopping it, by shutting off connection with one retort, when said retort may be opened and recharged.

What I claim as my invention, and desire to secure by Letters Patent, is—

1. A reservoir for containing dilute acid, arranged in relation to a generating-chamber or chambers, and so connected therewith, by means of suitable pipes and valves, that the acid-water in the generator will be automatically prevented from returning through the same channel, and will be compelled to pass through the whole length of the generator before returning to the reservoir, substantially as described.

2. A reservoir for containing dilute acid, in combination with two or more generating-chambers, and so connected therewith, by means of suitable pipes and valves, that the acid-water may be supplied to or excluded from any one or all of them at the will of the operator, substantially as shown and described.

3. The reservoir and retorts, arranged, in relation to each other, in the manner described, so that the weakened or waste acid and water, after use, can be returned to the reservoir or discharged from the apparatus automatically, as and for the purpose described.

4. The carbureter B, placed within the acid-water reservoir, so as to be entirely surrounded by and submerged in the dilute acid, as and for the purposes set forth.

5. The diaphragms or aprons F for the tubes to rest upon, as described.

6. The inlet-pipes G G and valves in connection therewith, as herein described.

7. The discharge-pipes I I extending from the retorts into the reservoir, as and for the purposes described.

8. The combination of the reservoir A, the carbureter B, and retorts C C, as and for the purposes herein described.

JOHN H. STEINER.

Witnesses:

DANIEL E. RYAN,

D. M. MARTIN.